United States Patent
Tada

(10) Patent No.: US 9,981,316 B2
(45) Date of Patent: May 29, 2018

(54) ALIGNMENT SYSTEM AND METHOD FOR VERTICAL LATHE

(71) Applicant: Toshiba Kikai Kabushiki Kaisha, Chiyoda-ku, Tokyo (JP)

(72) Inventor: Atsushi Tada, Numazu (JP)

(73) Assignee: TOSHIBA KIKAI KABUSHIKI KAISHA, Chiyoda-Ku, Tokyo (JP)

( * ) Notice: Subject to any disclaimer, the term of this patent is extended or adjusted under 35 U.S.C. 154(b) by 371 days.

(21) Appl. No.: 14/789,703

(22) Filed: Jul. 1, 2015

(65) Prior Publication Data
US 2016/0001373 A1     Jan. 7, 2016

(30) Foreign Application Priority Data

Jul. 2, 2014   (JP) .................................. 2014-136658

(51) Int. Cl.
    *B23B 25/06*     (2006.01)
    *G01M 1/14*     (2006.01)
    (Continued)

(52) U.S. Cl.
    CPC .......... *B23B 25/06* (2013.01); *B23Q 11/0035* (2013.01); *G01M 1/14* (2013.01);
    (Continued)

(58) Field of Classification Search
    CPC .......... B23B 2250/04; B23B 2260/004; B23B 2265/12; B23B 25/06; B23B 5/18;
    (Continued)

(56) References Cited

U.S. PATENT DOCUMENTS 5,493,763 A * 2/1996 Yamanaka ......... B23Q 11/0032
                                                    29/27 C
5,627,762 A * 5/1997 Cameron ................ G01M 1/22
                                                    700/279
(Continued)

FOREIGN PATENT DOCUMENTS

JP        59-077327       5/1984
JP        H01-227802     9/1989
(Continued)

OTHER PUBLICATIONS

English Language Abstract of JP 02-190732 issued Jul. 26, 1990.
(Continued)

*Primary Examiner* — Chun Cao
(74) *Attorney, Agent, or Firm* — DLA Piper LLP US

(57) ABSTRACT

Disclosed is an alignment system for a vertical lathe, the lathe configured to perform a cutting process on a workpiece (W) mounted on a circular turn table (3) by rotating the workpiece (W), and the alignment system configured to, when the lathe performs the cutting process on an unbalanced eccentric workpiece, perform a center alignment operation for correcting imbalance. The alignment system includes an alignment mechanism which includes: multiple alignment weights (13) provided movable along an outer periphery (3a) of the circular turn table (3); and a movement mechanism (15) configured to move the alignment weights along the outer periphery (3a) of the turn table (3). The alignment system further includes a control unit (7) configured to calculate setting positions for the alignment weights (13), and to set the alignment weights (13) at the calculated setting positions using the movement mechanism (15), in order to correct the imbalance.

4 Claims, 10 Drawing Sheets

(51) Int. Cl.
*G01M 1/32* (2006.01)
*G05B 19/402* (2006.01)
*B23Q 11/00* (2006.01)
*G01M 1/30* (2006.01)

(52) U.S. Cl.
CPC ............... *G01M 1/30* (2013.01); *G01M 1/32* (2013.01); *G05B 19/402* (2013.01); *B23B 2250/04* (2013.01); *B23B 2260/004* (2013.01); *B23B 2265/12* (2013.01); *G05B 2219/36204* (2013.01)

(58) Field of Classification Search
CPC .. B23Q 11/0035; B23Q 11/0032; G01M 1/14; G01M 1/30; G01M 1/32; G05B 19/402; G05B 2219/36204
USPC ........................................................ 700/160
See application file for complete search history.

(56) References Cited

U.S. PATENT DOCUMENTS

| | | | | |
|---|---|---|---|---|
| 6,065,338 A * | 5/2000 | Stoiber | ............... | F16F 15/36 318/560 |
| 6,595,052 B2 * | 7/2003 | Wharton | ............... | G01M 1/20 73/1.14 |
| 8,051,709 B2 * | 11/2011 | Allen | ............... | F01D 5/027 73/460 |

FOREIGN PATENT DOCUMENTS

| JP | 02-190732 | 7/1990 |
|---|---|---|
| JP | 06-137985 | 5/1994 |
| JP | H08-152047 | 6/1996 |
| JP | S63-034415 | 7/1998 |
| JP | 2000-275133 | 10/2000 |
| JP | 2003-053634 | 2/2003 |
| JP | 2003-103459 | 4/2003 |
| JP | 2005-199411 | 7/2005 |
| JP | 2006-035360 | 2/2006 |

OTHER PUBLICATIONS

English Language Abstract of JP 06-137985 issued May 20, 1994.
English Language Abstract of JP 59-077327 issued May 2, 1984.
Japanese Office Action (with English Language Translation) issued in JP 2014-136658 dated Oct. 6, 2017.
English Language Abstract of JP S63-034415 published Jul. 11, 1998.
English Language Abstract of JP H08-152047 published Jun. 11, 1996.
English Language Abstract of JP H01-227802 published Sep. 12, 1989.
English Language Abstract of JP 2006-035360 published Feb. 9, 2006.
English Language Abstract of JP 2005-199411 published Jul. 28, 2006.
English Language Abstract of JP 2003-103459 published Apr. 8, 2003.
English Language Abstract of JP 2003-053634 published Feb. 26, 2003.
English Language Abstract of JP 2000-275133 published Oct. 6, 2000.

* cited by examiner $$RW = R1W1\cos\alpha 1 + R2W2\cos\alpha 2 \quad \cdots(f1)$$

$$R1 = R2 = r, W1 = W2 = W, \alpha 1 = \alpha 2 = \alpha \quad \cdots(f2)$$

$$RW = 2(r \cdot W\cos\alpha) \quad \cdots(f3)$$

$$\alpha = \cos^{-1}\frac{RW}{2rw} \quad \cdots(f4)$$

FIG. 9H
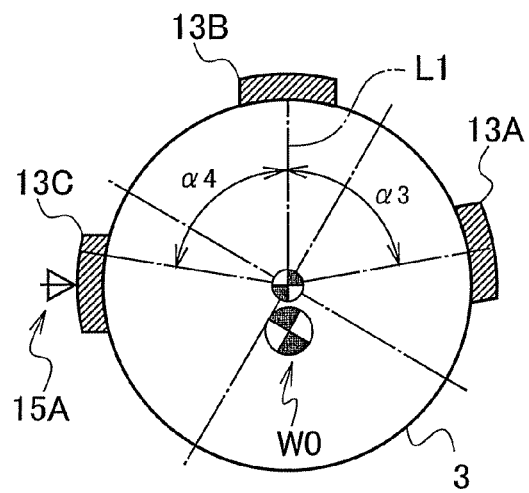
FIG. 9I
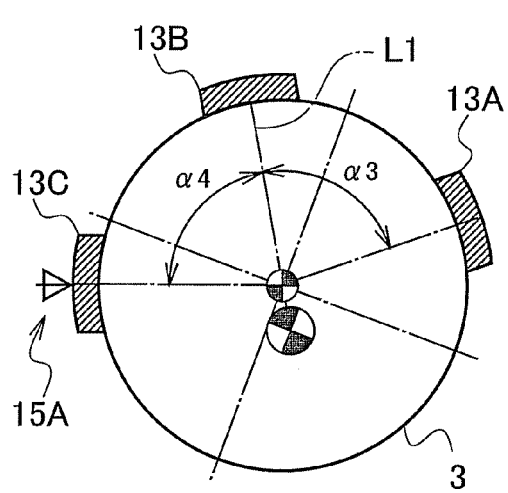
FIG. 10
$$RW - R_2W_2 = R_1W_1\cos\alpha_1 + R_3W_3\cos\alpha_3 \quad \cdots(f1)$$
$$\alpha = \cos^{-1}\frac{RW - R_2W_2}{2rw} \quad \cdots(f2)$$

ALIGNMENT SYSTEM AND METHOD FOR VERTICAL LATHE

CROSS-REFERENCE TO RELATED APPLICATIONS

This application is based upon and claims the benefit of the priority from the prior Japanese Patent Application No. 2014-136658 (filed Jul. 2, 2014); the entire contents of which are incorporated herein by reference.

BACKGROUND OF THE INVENTION

Field of the Invention

The present invention relates to a vertical lathe configured to perform a cutting process on a workpiece mounted on a turn table for rotating the workpiece, and particularly to an alignment system and method for the vertical lathe which, even when the lathe performs the cutting process on an unbalanced eccentric workpiece, are capable of correcting imbalance automatically and accurately.

Description of the Related Art

In general, as vertical lathes and the like, there is a known vertical lathe configured to rotate a workpiece to be processed, which is mounted on a table, and to perform a cutting process on the rotating workpiece with a tool. Such vertical lathe has a problem that: imbalance occurs depending on the shape of the workpiece; and vibrations thus occur during the process.

Various methods have been proposed to solve the problem with the imbalance.

As documents related to conventional techniques, for example, there are Japanese Patent Application Publications Nos. Hei 2-190732, Hei 6-137985 and Sho 63-34415.

However, the conventional techniques have the following problems because measurement and calculation for correcting the imbalance are very complicated, and because it is difficult to obtain an accurate setting position(s) for the adjustment weight(s):

1. incapability of correcting the imbalance automatically and accurately;
2. constraint on the working area when adjustments are made to an unbalanced workpiece by putting an adjustment weight(s) and the like on the table; and
3. incapability of handling angular misalignment particularly in a case of a direct drive balancer.

SUMMARY OF THE INVENTION

The present invention has been carried out in light of these technical problems.

An object of the present invention is to provide an alignment system and method for a vertical lathe which, when the lathe performs a cutting process on an unbalanced eccentric workpiece, are capable of correcting imbalance automatically and accurately.

According to an aspect of the present invention, an alignment system for a vertical lathe configured to perform a cutting process on a workpiece mounted on a circular turn table by rotating the workpiece, the alignment system configured to, when the lathe performs the cutting process on an unbalanced eccentric workpiece, perform a center alignment operation for correcting imbalance, comprising:

an alignment mechanism including
a plurality of alignment weights provided movable along an outer periphery of the circular turn table, and
a movement mechanism configured to move the alignment weights along the outer periphery of the turn table; and
a control unit configured to calculate setting positions for the alignment weights, and to set the alignment weights at the calculated setting positions using the movement mechanism, in order to correct the imbalance.

According to another aspect of the present invention, a center of gravity of the eccentric workpiece, a distance from a central point of the turn table to the eccentric workpiece, and a phase angle of the eccentric workpiece to a position on the turn table are determined in advance at a time when the eccentric workpiece is mounted on the turn table, and are inputted into the control unit in advance.

According to another aspect of the present invention, weights of the plurality of alignment weights are equal to each other, and distances from the central point of the turn table to the plurality of alignment weights are equal to each other as well.

According to another aspect of the present invention, the plurality of alignment weights are arranged symmetrically with respect to a center line defined as a straight line joining a center of gravity of the eccentric workpiece and a center of gravity of the turn table, angles of the setting positions for the alignment weights to the center line are equal to each other, and the control unit calculates the angles of the setting positions for the alignment weights.

According to another aspect of the present invention, an alignment method of performing a center alignment operation for a vertical lathe configured to perform a cutting process on a workpiece mounted on a circular turn table by rotating the workpiece, the alignment method being configured such that when the lathe performs the cutting process on an unbalanced eccentric workpiece, a control unit corrects imbalance using an alignment mechanism which includes a plurality of alignment weights provided movable along an outer periphery of the circular turn table and a movement mechanism for moving the alignment weights along the outer periphery of the turn table comprising the steps of:

calculating setting positions for the alignment weights in order to correct the imbalance by the control unit, and
setting the alignment weights at the calculated setting positions using the movement mechanism according to the control of the control unit.

BRIEF DESCRIPTION OF THE DRAWINGS

FIGS. 9H and 9I are diagrams for explaining how the alignment mechanism of the embodiment of the present invention works.

FIG. 10 is a diagram for explaining how the alignment mechanism of the embodiment of the present invention works.

DETAILED DESCRIPTION OF THE PREFERRED EMBODIMENT

Certain embodiments of the present invention will be described hereinafter with reference to the appended drawings.

Certain embodiments of the present invention will be described hereinafter with reference to the appended drawings.

A vertical lathe of an embodiment of the present invention includes: an alignment mechanism configured to, when the lathe performs a cutting process on an unbalanced workpiece, perform center alignment operation for correcting the imbalance using alignment weights; and a control unit configured to control the alignment mechanism.

It should be noted that: in the embodiment, the control unit configured to control a process to be performed by the vertical lathe is also designed to control the alignment mechanism; and the control unit and the alignment mechanism forms an alignment system.

First of all, descriptions will be provided for a configuration of the alignment system for the vertical lathe of the embodiment of the present invention.

Figure 1:
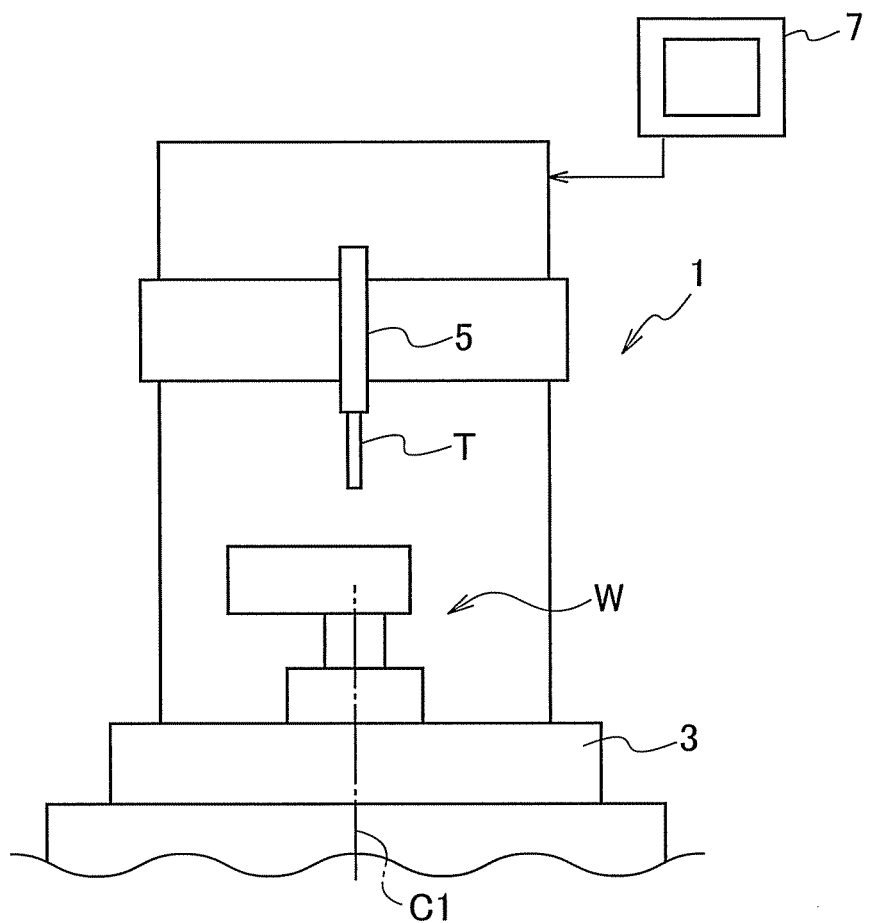
FIG. 1 is a schematic diagram of a vertical lathe of an embodiment of the present invention.

FIG. 1 is a schematic diagram of the vertical lathe of the embodiment of the present invention.

As shown in FIG. 1, the vertical lathe 1 includes: a circular turn table 3 configured to turn with a workpiece W thereon; and a ram 5 provided movably in vertical and left-right directions relative to the workpiece W on the turn table 3. A tool T is provided to a lower end portion of the ram 5. Incidentally, the upper surface of the turn table 3 is a horizontal surface.

The vertical lathe 1 further includes a control unit 7 configured to, based on a process control program, make the ram 5 perform a cutting process on the workpiece W by: turning the turn table 3; and moving the ram 5 in predetermined directions. In addition, the control unit 7 is also configured to control the alignment mechanism, which will be described latter. It should be noted that reference sign C1 in FIG. 1 denotes the center line (or a central point) of the turn table 3.

Figure 2A:
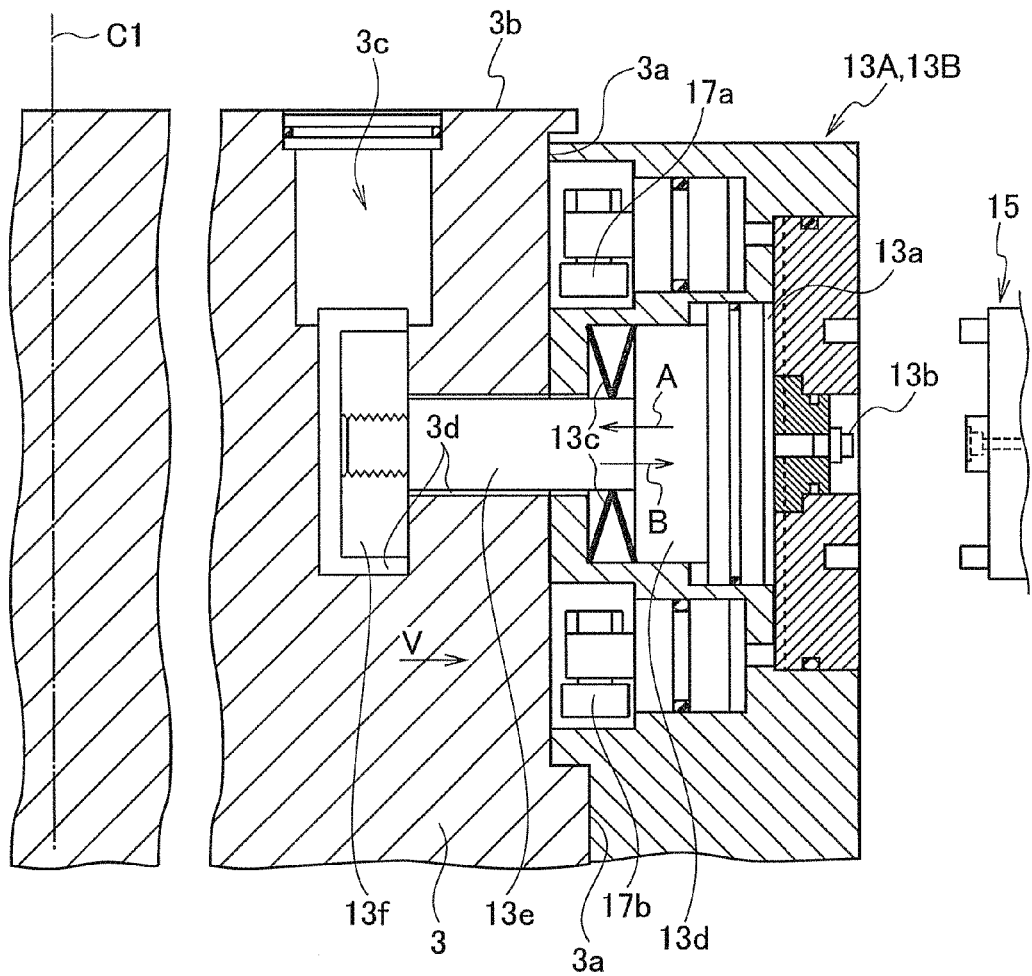
FIGS. 2A and 2B are schematic diagrams of an alignment mechanism of the embodiment of the present invention configured to perform center alignment using alignment weights.
Figure 2B:
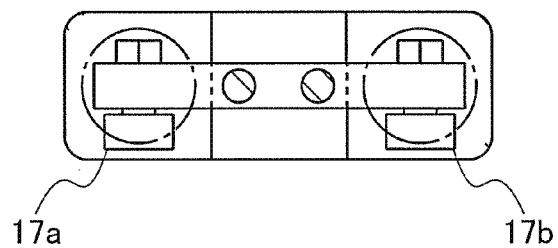

FIGS. 2A and 2B are schematic diagrams of the alignment mechanism configured to perform center alignment using alignment weights.

As shown in FIGS. 2A, 2B and 3A to 3D, the alignment mechanism includes two alignment weights 13A, 13B provided on an outer periphery 3a of the circular turn table 3. The alignment weights 13A, 13B are moveable along the outer periphery 3a of the turn table 3.

FIG. 2A is a partial cross-sectional view of the turn table 3, a part of which one alignment weight 13 is attached to. In addition, FIG. 2B is a configuration diagram of a section including cam followers 17a, 17b in each of the alignment weights 13A, 13B, which is viewed in a direction indicated with an arrow V in FIG. 2A.

As shown in FIG. 2A, the alignment mechanism is designed such that the alignment weight 13 is attached to the outer periphery 3a of the turn table 3 in the way that the alignment weight 13 is movable along the outer periphery 3a of the turn table 3. To this end, the alignment mechanism has the following configuration.

To begin with, a hole 3c is formed in the upper surface 3b of the turn table 3. Under the hole 3c, a T-slot 3d horizontally extending from a lower portion of the hole 3c and reaching the outer periphery 3a is formed along a circular direction of the turn table 3.

Meanwhile, a movement mechanism is provided inside the alignment weight 13. The movement mechanism configure to attach the alignment weight 13 to the outer periphery 3a of the turn table 3 in the way that the alignment weight 13 is movable along the outer periphery 3a thereof.

To put it concretely, the movement mechanism includes: an oil supplier 15 configured to supply oil from outside; a coupler 13b configured to receive the oil from the oil supplier 15 and to supply the oil to a hydraulic pressure chamber 13a; and a movement member 13d provided in a way that hydraulic pressure of the oil from the coupler 13b moves the movement member 13d inside the hydraulic pressure chamber 13a against a disk spring 13c in a direction indicated with an arrow A. One end of a connection member 13e movable inside the T-slot 3d is attached to the movement member 13d, while the other end of the connection member 13e is attached to a fixation member 13f capable of being fixed to and unfixed from the inside of the T-slot 3d.

By the foregoing configuration, the alignment mechanism is designed such that: the movement member 13d is usually biased by the disk spring 13c in a direction indicated with an arrow B; and thus, the fixation member 13f is put in contact with a side wall of the T-slot 3d, and the alignment weight 13 itself is fixed to the outer periphery 3a of the turn table 3.

Meanwhile, the movement of the alignment weight 13 can be achieved by: connecting the oil supplier 15 to the coupler 13b; supplying the oil from the oil supplier 15 to the hydraulic pressure chamber 13a; thereby moving the movement member 13d in the direction indicated with the arrow A against the disk spring 13c; thus bringing the alignment weight 13 away from the outer periphery 3a of the turn table 3. Accordingly, the alignment weight 13 become moveable along the outer periphery 3a of the turn table 3.

It should be noted that the cam followers 17a, 17b configured to assist the alignment weight 13 in moving along the outer periphery 3a of the turn table 3 are provided at the respective positions higher and lower than the hydraulic pressure chamber 13a.

The thus-configured alignment mechanism makes it possible to set the alignment weight 13 at a desired position on the outer periphery 3a of the turn table 3.

Figure 3A:
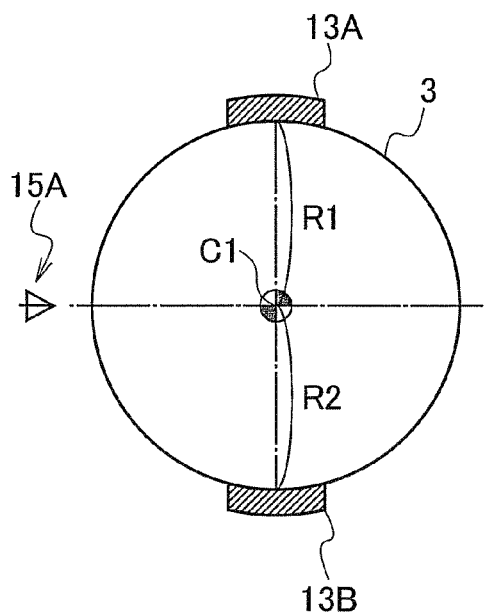
FIGS. 3A to 3D are diagrams for explaining how the alignment mechanism of the embodiment of the present invention works.
Figure 3B:
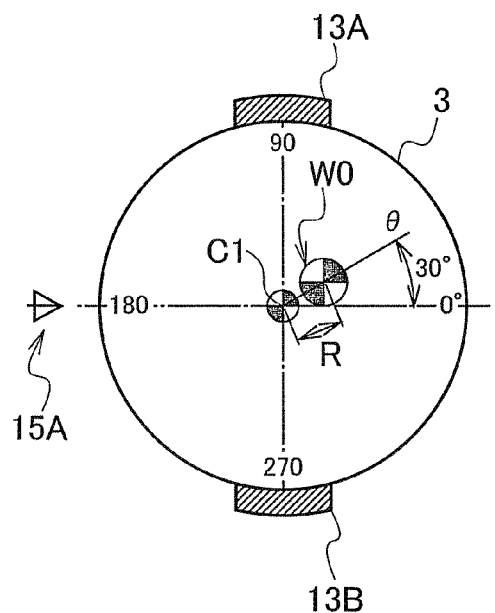
Figure 3C:
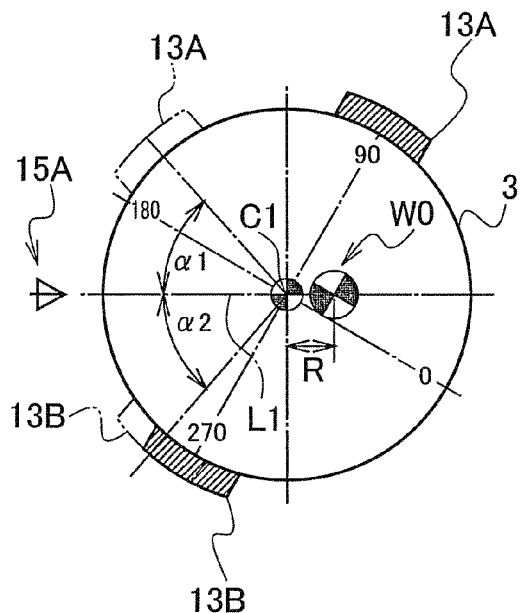
Figure 3D:
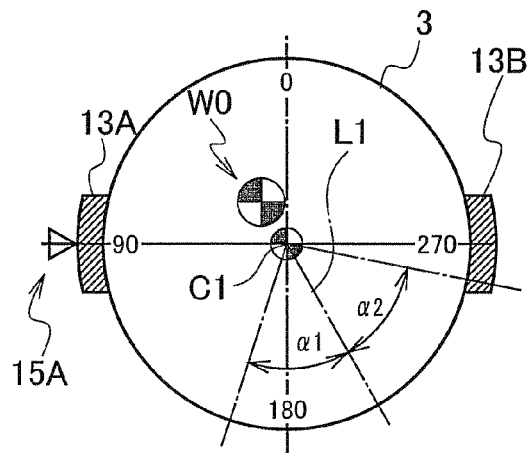
Figure 4E:
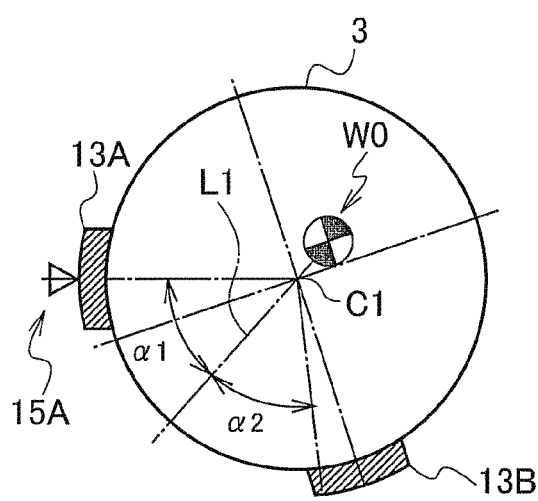
FIGS. 4E to 4H are diagrams for explaining how the alignment mechanism of the embodiment of the present invention works.

Next, referring to FIGS. 3A to 3D and 4E to 4G, descriptions will be provided for how the alignment mechanism works to perform center alignment on an unbalanced workpiece. In this respect, the descriptions will be provided using an eccentric workpiece W as shown in FIG. 5.

FIGS. 3A to 3D are explanatory diagrams showing how the alignment mechanism of the embodiment of the present invention works.

In order to perform the center alignment on the eccentric workpiece W when the unbalanced condition is occurred due to eccentricity of the eccentric workpiece W, the work of the alignment mechanism includes: calculating set positions of the two alignment weights 13A, 13B; and moving the alignment weights 13A, 13B to the calculated set positions.

In this embodiment, referring to FIG. 3A, at a time when the eccentric workpiece W is mounted on the turn table 3, there are predetermined: a center of gravity W0 of the eccentric workpiece W; a distance R from a central point C1 of the turn table 3 to the eccentric workpiece W; and a phase angle θ of the eccentric workpiece W to a position on the turn table 3. The center of gravity W0, the distance R and the phase angle θ are inputted into the control unit 7 in advance.

In this case, weights 13W1, 13W2 of the two respective alignment weights 13A, 13B are equal to each other (13W1=13W2), while distances R1, R2 from the central point C1 of the turn table 3 to the two respective alignment weights 13A, 13B are equal to each other (R1=R2) as well.

In other words, the weights 13W1, 13W2 of the two respective alignment weights 13A, 13B are at a fixed value w, and the distances R1, R2 from the central point C1 of the turn table 3 to the two respective alignment weights 13A, 13B are at a fixed value r.

As shown in FIG. 3A, before the eccentric workpiece W is mounted on the turn table 3, the center of gravity coincide with a center of gravity of the turn table 3; and the center of gravity is located at a position of the central point C1.

Next, when the eccentric workpiece W is mounted on the turn table 3, the center of gravity W0 of the eccentric workpiece W is located at a position which is away from the central point C1 of the turn table 3 by distance R, and away from the phase 0° of the turn table 3 by θ (θ=30°), as shown in FIG. 3B.

At this time, as shown in FIG. 3C, firstly, in order to use the phase θ (θ=30°) of the center of gravity W0 as a reference, the phase θ (θ=30°) of the center of gravity W0 is shifted to 0°, which is the phase of the turn table 3. Thereafter, the control unit 7 calculates the angles of the setting positions for the two respective alignment weights 13A, 13B, as described later.

It should be noted that in this process, the two alignment weights 13A, 13B are arranged symmetrically with respect to a center line L1 defined as a straight line joining the center of gravity W0 of the eccentric workpiece W and the central point C1 of the turn table 3. For this reason, the angles α1, α2 of the setting positions for the two respective alignment weights 13A, 13B to the center line L1 are equal to each other (α1=α2=α).

As shown in FIG. 6, by inserting conditions expressed with Equation (f2) into Equation (f1), Equation (f3) is introduced. Equation (f4) is derived from the Equation (f3).

Thereafter, the angle α of the setting positions for the two respective alignment weights 13A, 13B is obtained and accordingly determined by calculating Equation (f4).

In this case, the angles α1, α2 (α=α1=α2) of the setting positions for the two respective alignment weights 13A, 13B are as shown FIG. 3C.

Next, as shown in FIG. 3D, the turn table 3 is turned in order for the alignment weight 13A to come to a position 15A of the oil supplier 15 configured to supply the oil from outside.

At this time, the oil supplier 15 and the coupler 13b are coupled together, and the oil is supplied by the oil supplier 15 to the hydraulic pressure chamber 13a. Thus, the alignment weight 13A becomes movable along the outer periphery 3a of the turn table 3. Afterward, as shown in FIG. 4E, the alignment weight 13A is moved to a position at an angle of α1 to the center line L1.

Figure 4F:
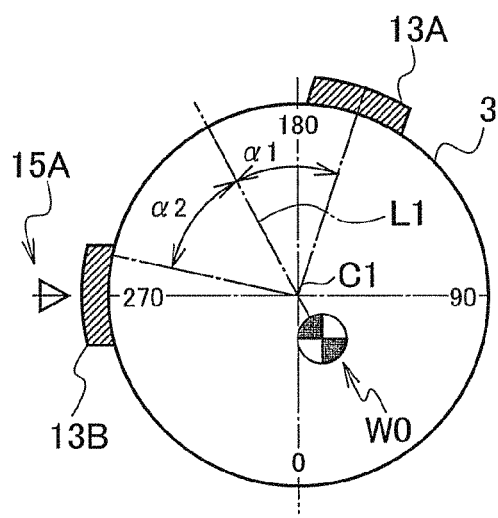
Figures 5, 6:
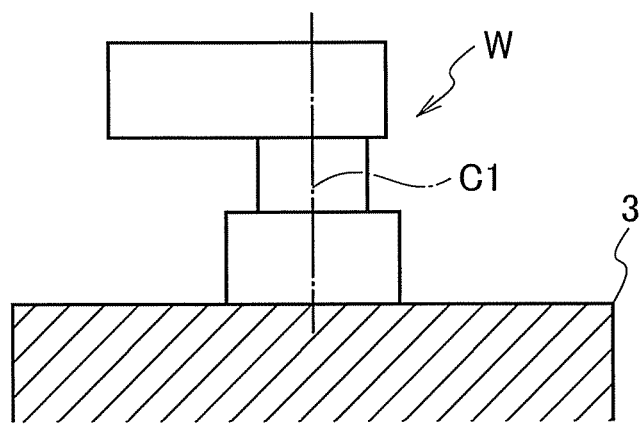
FIG. 5 is a diagram for explaining how the alignment mechanism of the embodiment of the present invention works.
FIG. 6 is a diagram for explaining how the alignment mechanism of the embodiment of the present invention works.

Then, as shown in FIG. 4F, the turn table 3 is turned in order for the alignment weight 13B to come to the position 15A of the oil supplier 15 configured to supply the oil from outside.

Figure 4G:
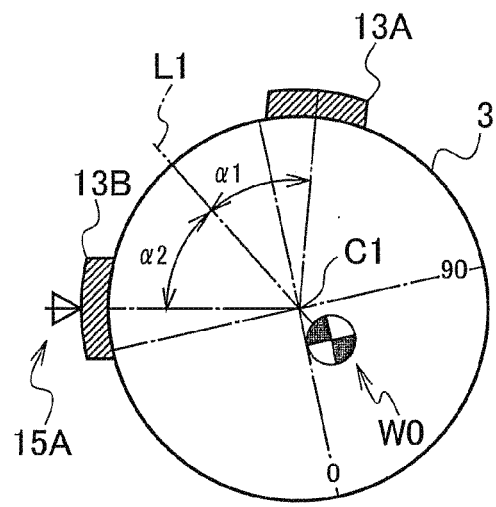

At this time, the oil supplier 15 and the coupler 13b are coupled together, and the oil is supplied by the oil supplier 15 to the hydraulic pressure chamber 13a. Thus, the alignment weight 13B becomes movable along the outer periphery 3a of the turn table 3. Afterward, as shown in FIG. 4G, the alignment weight 13B is moved to a position at an angle of α2 to the center line L1.

Figure 4H:
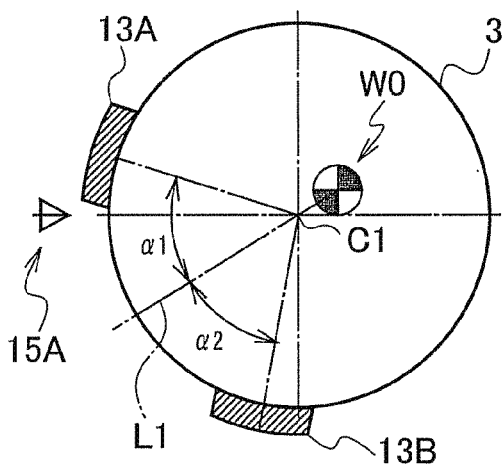

As a result, the alignment weights 13A, 13B set at the positions as shown in FIG. 4H can be obtained, and thereby the imbalance can be corrected automatically and accurately.

In this respect, the control of the action of the oil supplier 15 and the control of the turn of the turn table 3 for the purpose of moving the two alignment weights 13A, 13B to the setting positions are performed by the control unit 7 based on the angle α of the setting positions, which is calculated as described above. Otherwise, the control of the action of the oil supplier 15 may be instead performed manually by the operator.

Next, referring to FIG. 7A to FIG. 10, descriptions will be provided for a modification of the embodiment.

The modification will describe an alignment system including three alignment weights 13A, 13B, 13C, while the foregoing embodiment has described the alignment system including the two alignment weights 13A, 13B.

The modification also determines: a center of gravity W0 of the eccentric workpiece W; a distance R from a central point C1 of the turn table 3 to the eccentric workpiece W; and a phase angle θ of the eccentric workpiece W to a position on the turn table 3. The center of gravity W0, the distance R and the phase angle θ are inputted into the control unit 7 in advance. Weights 13W1, 13W2, 13W3 of the three respective alignment weights 13A, 13B, 13C are equal to one another (13W1=13W2=13W3), while distances R1, R2, R3 from the central point C1 of the turn table 3 to the three respective alignment weights 13A, 13B, 13C are equal to one another (R1=R2=R3) as well.

In other words, the weights 13W1, 13W2, 13W3 of the three respective alignment weights 13A, 13B, 13C are at a fixed value w, and the distances R1, R2, R3 from the central point C1 of the turn table 3 to the three respective alignment weights 13A, 13B, 13C are at a fixed value r.

In addition, the modification is configured such that one (the alignment weight 13B in this case) of the three alignment weights 13A, 13B, 13C is attached on a straight line joining the central point C1 of the turn table 3 and the center of gravity of the eccentric workpiece W.

Figure 7A:
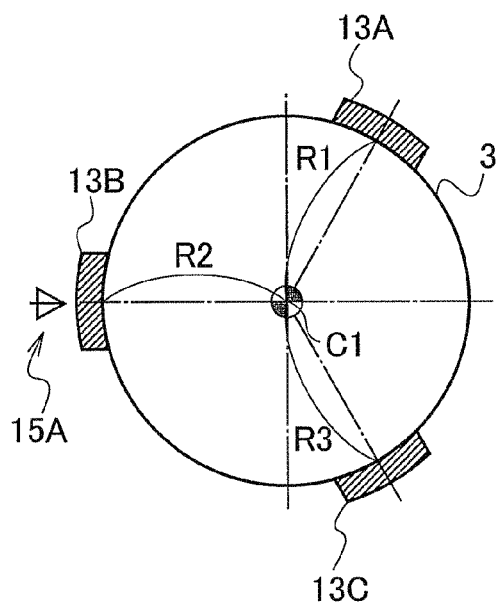
FIGS. 7A to 7D are diagrams for explaining how the alignment mechanism of the embodiment of the present invention works.

As shown in FIG. 7A, before the eccentric workpiece W is mounted on the turn table 3, the center of gravity coincide with a center of gravity of the turn table 3 and the center of gravity is located at a position of the central point C1.

Figure 7B:
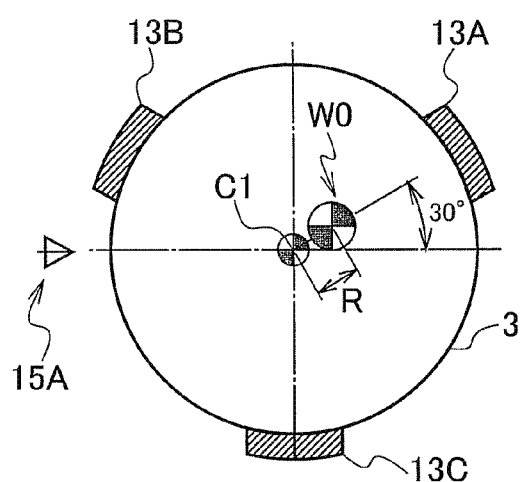

Next, when the eccentric workpiece W is mounted on the turn table 3, the center of gravity W0 is located at a position which is away from the central point C1 of the turn table 3 by R, and away from the phase 0° of the turn table 3 by θ (θ=30°), as shown in FIG. 7B.

Figure 7C:
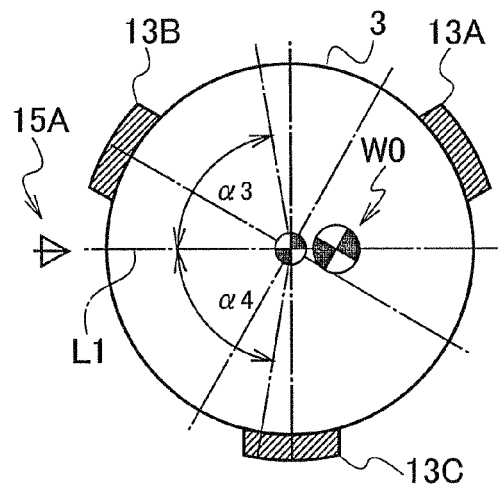

At this time, as shown in FIG. 7C, in order to use the phase θ (θ=30°) of the center of gravity W0 as a reference, the phase θ (θ=30°) of the center of gravity W0 is shifted to 0°, which is the phase of the turn table 3. Thereafter, the control unit 7 calculates the angles of the setting positions for the three respective alignment weights 13A, 13B, 13C, as described later.

It should be noted that in this process, the two alignment weights 13A, 13C are arranged symmetrically with respect to a center line L1 defined as a straight line joining the center of gravity W0 of the eccentric workpiece W and the central point C1 of the turn table 3. For this reason, the angles α3, α4 of the setting positions for the two respective alignment weights 13A, 13C to the center line L1 are equal to each other (α3=α4=α).

By inserting the above-mentioned conditions into Equation (f1) in FIG. 10, Equation (f2) is introduced.

Thereafter, the angle α of the setting positions for the two respective alignment weights 13A, 13C is obtained and accordingly determined by calculating Equation (f2). The alignment weight 13B is attached on the straight line L1 joining the central point C1 of the turn table 3 and the center of gravity of the eccentric workpiece W.

In this modification, the angles α3, α4 (α=α3=α4) of the setting positions for the two respective alignment weights 13A, 13C are as shown FIG. 7C.

Figure 7D:
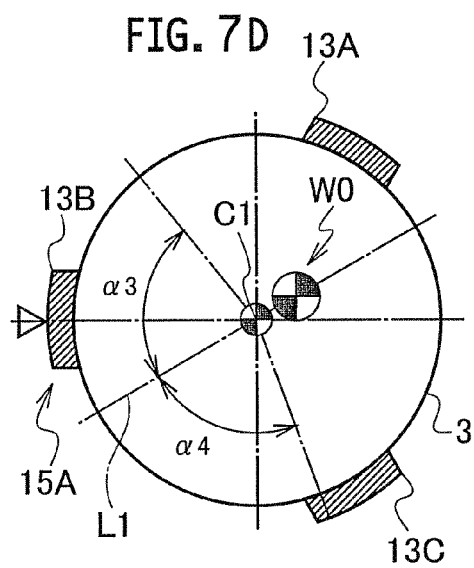

Next, as shown in FIG. 7D, the turn table 3 is turned in order for the alignment weight 13B to come to the position 15A of the oil supplier 15 configured to supply the oil from outside.

Figure 8E:
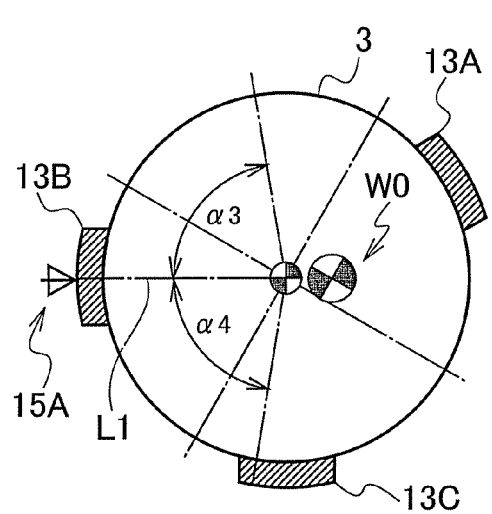
FIGS. 8E to 8G are diagrams for explaining how the alignment mechanism of the embodiment of the present invention works.

At this time, the oil supplier 15 and the coupler 13b are coupled together, and the oil is supplied by the oil supplier 15 to the hydraulic pressure chamber 13a. Thus, the alignment weight 13B becomes movable along the outer periphery 3a of the turn table 3. Afterward, as shown in FIG. 8E, the alignment weight 13B is moved to a position on the center line L1 joining the central point C1 of the turn table 3 and the center of gravity of the eccentric workpiece W.

Figure 8F:
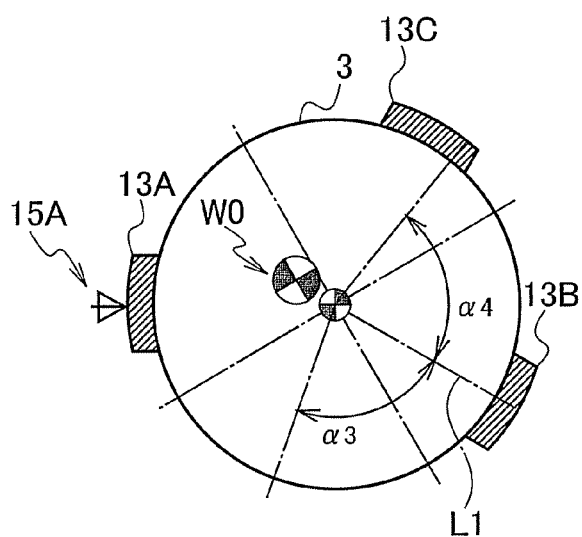

Then, as shown in FIG. 8F, the turn table 3 is turned in order for the alignment weight 13A to come to the position 15A of the oil supplier 15 configured to supply the oil from outside.

Figure 8G:
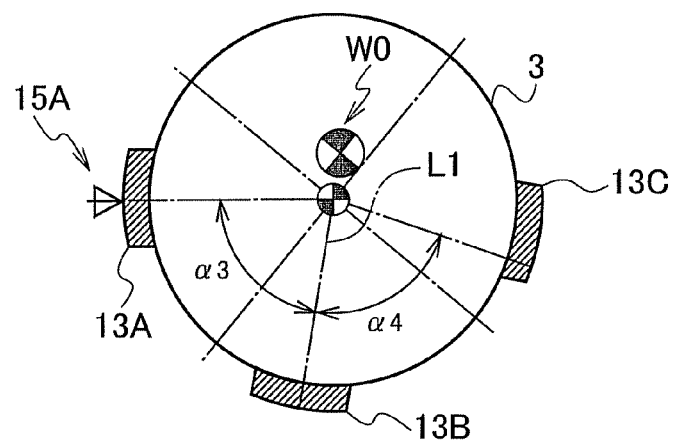

At this time, the oil supplier 15 and the coupler 13b are coupled together, and the oil is supplied by the oil supplier 15 to the hydraulic pressure chamber 13a. Thus, the alignment weight 13A becomes movable along the outer periphery 3a of the turn table 3. Then, as shown in FIG. 8G, the alignment weight 13A is moved to a position at an angle of α3 to the center line L1.

Afterward, as shown in FIG. 9H, the turn table 3 is turned in order for the alignment weight 13C to come to the position 15A of the oil supplier 15 configured to supply the oil from outside.

Subsequently, the oil supplier 15 and the coupler 13b are coupled together, and the oil is supplied by the oil supplier 15 to the hydraulic pressure chamber 13a. Thus, the alignment weight 13C becomes movable along the outer periphery 3a of the turn table 3. Afterward, as shown in FIG. 9I, the alignment weight 13C is moved to a position at an angle of α4 to the center line L1.

As a result, the alignment weights 13A, 13B, 13C set at the positions as shown in FIG. 9I can be obtained, and thereby the imbalance can be corrected automatically and accurately.

In this respect, the control of the action of the oil supplier 15 and the control of the turn of the turn table 3 for the purpose of moving the three alignment weights 13A, 13B, 13C to the setting positions are performed by the control unit 7 based on the angle α of the setting positions, which is calculated as described above. Otherwise, the control of the action of the oil supplier 15 may be instead performed manually by the operator.

In the case that the alignment system includes the three alignment weights, the alignment system is capable of dealing with larger eccentricity since an alignment weight at the center is arranged in a direction at an angle of 180 degrees to the eccentric workpiece (on the opposite side of the central point C1 of the turn table 3 from the eccentric workpiece).

The present invention is not limited to the foregoing embodiment. Appropriate changes to the present invention make it possible to carry out the present invention in various modes. In other words, the number of alignment weights may be a plural number of three or more (it does not matter whether the number is even or odd). An increase in the number of alignment weights makes overall balance in the arrangement better.

Figure 11A:
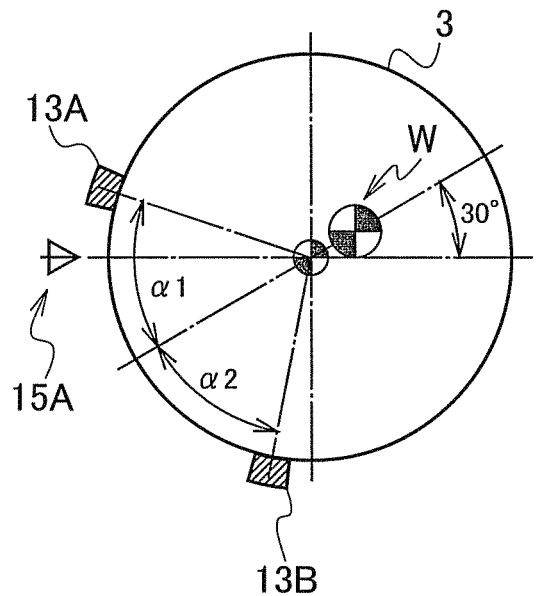
FIGS. 11A to 11B are diagrams for explaining how the alignment mechanism of the embodiment of the present invention works.
Figure 11B:
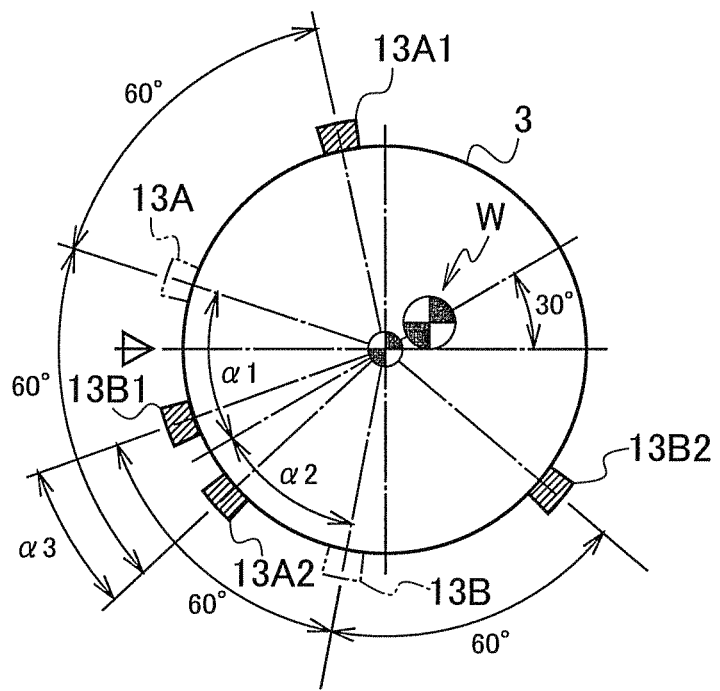

First of all, as shown in FIG. 11A, setting positions for the two imaginary alignment weights 13A, 13B are obtained in the same matter as described above. Subsequently, as shown in FIG. 11B, the alignment weight 13A is divided into two pieces which are away from the alignment weight 13A by 60 degrees, while the alignment weight 13B is divided into two pieces which are away from the alignment weight 13B by 60 degrees. Thereby, setting positions for the actual alignment weights are determined.

In other words, as shown in FIG. 11B, the alignment weight 13A is divided into alignment weights 13A1, 13A2 which are away from the alignment weight 13A by 60 degrees, while the alignment weight 13B is divided into alignment weights 13B1, 13B2 which are away from the alignment weight 13B by 60 degrees. Thereby, the four alignment weights 13A1, 13A2, 13B1, 13B2 are set.

Figure 12C:
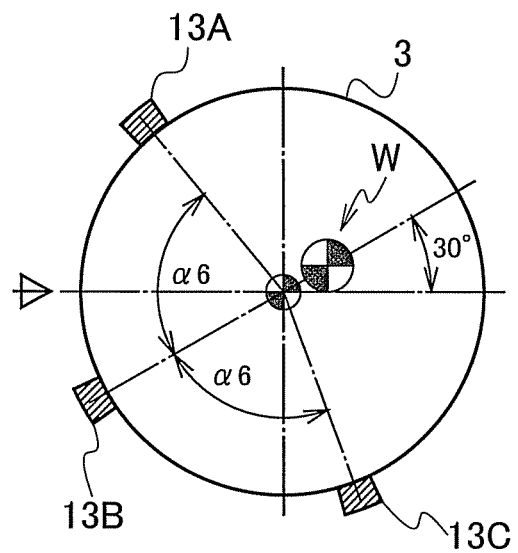
FIGS. 12C to 12D are diagrams for explaining how the alignment mechanism of the embodiment of the present invention works.
Figure 12D:
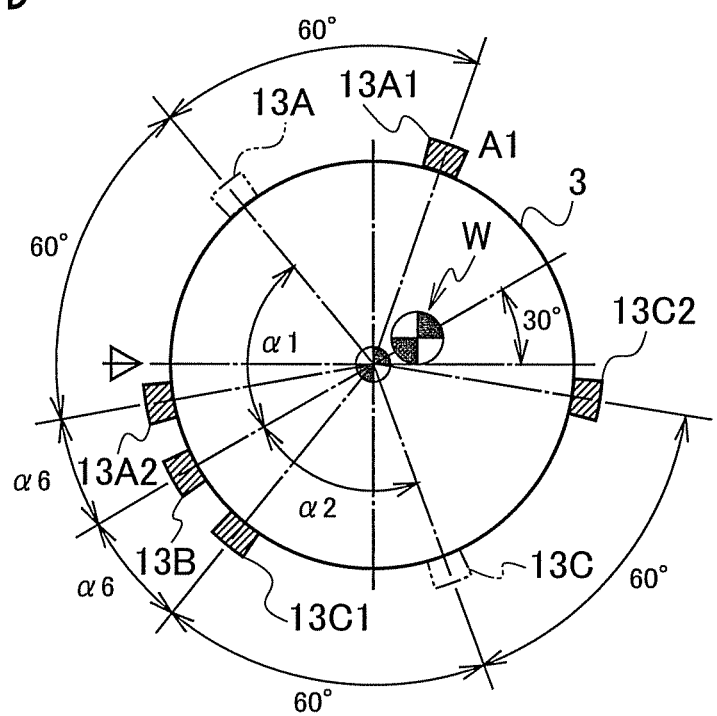

In another example of setting three or more alignment weights, the alignment system includes three alignment weights 13A, 13B, 13C. First of all, as shown in FIG. 12A, setting positions for the three imaginary alignment weights 13A, 13B, 13C are obtained in the same matter as described above. Subsequently, as shown in FIG. 12B, the alignment weight 13A is divided into two pieces which are away from the alignment weight 13A by 60 degrees, while the alignment weight 13C is divided into two pieces which are away from the alignment weight 13C by 60 degrees. Thereby, setting positions for the actual alignment weights are determined. In this case, the alignment weight 13B is set, as it is, without being divided into two pieces.

In other words, as shown in FIG. 12B, the alignment weight 13A is divided into alignment weights 13A1, 13A2 which are away from the alignment weight 13A by 60 degrees, while the alignment weight 13C is divided into alignment weights 13C1, 13C2 which are away from the alignment weight 13C by 60 degrees. Thereby, the five alignment weights 13A1, 13A2, 13B, 13C1, 13C2 are set.

What is claimed is:

1. An alignment system for a vertical lathe configured to perform a cutting process on a workpiece mounted on a circular turn table by rotating the workpiece, the alignment system configured to, when the lathe performs the cutting process on an unbalanced eccentric workpiece, perform a center alignment operation for correcting imbalance, comprising:
   an alignment mechanism including
      a plurality of alignment weights provided movable along an outer periphery of the circular turn table, and a movement mechanism configured to move the alignment weights along the outer periphery of the turn table; and a control unit configured to calculate setting positions for the alignment weights, and to set the alignment weights at the calculated setting positions using the movement mechanism, in order to correct the imbalance, wherein a center of gravity of the eccentric workpiece, a distance from a central point of the turn table to the eccentric workpiece, and a phase angle of the eccentric workpiece to a position on the turn table are determined in advance at a time when the eccentric workpiece is mounted on the turn table, and are inputted into the control unit in advance.

2. The alignment system of claim 1, wherein
weights of the plurality of alignment weights are equal to each other, and
distances from the central point of the turn table to the plurality of alignment weights are equal to each other as well.

3. The alignment system of claim 1, wherein
the plurality of alignment weights are arranged symmetrically with respect to a center line defined as a straight line joining a center of gravity of the eccentric workpiece and a center of gravity of the turn table,
angles of the setting positions for the alignment weights to the center line are equal to each other, and
the control unit calculates the angles of the setting positions for the alignment weights.

4. An alignment method of performing a center alignment operation for a vertical lathe configured to perform a cutting process on a workpiece mounted on a circular turn table by rotating the workpiece, the alignment method being configured such that when the lathe performs the cutting process on an unbalanced eccentric workpiece, a control unit corrects imbalance using an alignment mechanism which includes a plurality of alignment weights provided movable along an outer periphery of the circular turn table and a movement mechanism for moving the alignment weights along the outer periphery of the turn table, comprising the steps of:

determining in advance at a time when the eccentric workpiece is mounted on the turn table a center of gravity of the eccentric workpiece, a distance from a central point of the turn table to the eccentric workpiece, and a phase angle of the eccentric workpiece to a position on the turn table, inputting into the control unit in advance of lathing the center of gravity, the distance, and the phase angle, the control unit calculating setting positions for the alignment weights in order to correct the imbalance, and setting the alignment weights at the calculated setting positions using the movement mechanism according to the control of the control unit.

* * * * *